US012324445B2

United States Patent
Bechtold et al.

(10) Patent No.: US 12,324,445 B2
(45) Date of Patent: Jun. 10, 2025

(54) PROTEIN COMPOSITION

(71) Applicant: General Mills, Inc., Minneapolis, MN (US)

(72) Inventors: Roy Bechtold, St. Louis Park, MN (US); Richard Ganis, Cooper City, FL (US)

(73) Assignee: General Mills, Inc., Minneapolis, MN (US)

( * ) Notice: Subject to any disclaimer, the term of this patent is extended or adjusted under 35 U.S.C. 154(b) by 727 days.

(21) Appl. No.: 16/263,661

(22) Filed: Jan. 31, 2019

(65) Prior Publication Data

US 2020/0245641 A1 Aug. 6, 2020

(51) Int. Cl.
*A23J 3/10* (2006.01)
*A23J 3/16* (2006.01)

(52) U.S. Cl.
CPC . *A23J 3/10* (2013.01); *A23J 3/16* (2013.01); *A23V 2002/00* (2013.01); *A23V 2200/13* (2013.01); *A23V 2200/236* (2013.01); *A23V 2200/244* (2013.01); *A23V 2250/54246* (2013.01); *A23V 2250/5488* (2013.01)

(58) Field of Classification Search
CPC .......... A23G 1/30; A23G 3/34; A23C 9/1526; A23C 21/06; A23P 30/20; A23J 3/10; A23J 3/16; A23J 3/26; A23J 3/265; A23V 2002/00; A23V 2250/54246; A23V 2250/54252; A23V 2250/5488; A23V 2200/13; A23V 2200/244; A23V 2200/236
USPC .......................................................... 426/656
See application file for complete search history.

(56) References Cited

U.S. PATENT DOCUMENTS

| | | | |
|---|---|---|---|
| 3,928,646 A | 12/1975 | Hartley | |
| 4,514,430 A | 4/1985 | Hartman | |
| 5,071,668 A | 12/1991 | Van Lengerich et al. | |
| 7,029,714 B2 | 4/2006 | Mihalos et al. | |
| 2005/0226960 A1 * | 10/2005 | Boice | A23L 33/26 426/72 |
| 2007/0042106 A1 * | 2/2007 | Wagner | A23L 33/17 426/656 |
| 2007/0178204 A1 | 8/2007 | Savul et al. | |
| 2008/0317932 A1 | 12/2008 | Long et al. | |
| 2014/0154363 A1 | 6/2014 | Duffy et al. | |

FOREIGN PATENT DOCUMENTS

AU 2007201055 3/2007

* cited by examiner

*Primary Examiner* — Lien T Tran
*Assistant Examiner* — Tynesha L McClain
(74) *Attorney, Agent, or Firm* — Jordan IP Law, LLC; Rachel A. Kahler

(57) ABSTRACT

Methods are disclosed for making a high protein, pliable food composition that remains pliable over a shelf life of at least 6 months, and food compositions made by disclosed methods. Food products containing disclosed food compositions are also disclosed.

20 Claims, No Drawings

PROTEIN COMPOSITION

BACKGROUND

Consumers are increasingly looking for foods that meet their nutritional needs without requiring preparation. Ready-to-eat protein products meet a need for consumers. Ready-to-eat protein products are particularly challenging because high protein content can cause hardening over the shelf life and/or cause an unpleasant taste. Thus, there is a need for good-tasting ready-to-eat protein products that retain a desirable texture over shelf life.

SUMMARY

The present disclosure relates to methods of making a food composition are provided.

In some embodiments, a method of making a food composition includes combining ingredients to produce a mixture having a protein content of at least 30% protein by dry weight of the mixture, the ingredients including: 1) a protein blend in an amount of about 35% to 50% by weight of the mixture, the protein blend including caseinate in an amount of at least 4% by weight of the protein blend, a highly soluble protein in an amount of at least 30% by weight of the protein blend, and insoluble protein in an amount of at least 12% by weight of the protein blend; and 2) a liquid composition in an amount of about 50% to about 65% by weight of the mixture; and applying shear to the mixture for a sufficient amount of time to achieve a temperature increase in the mixture of at least 5° C. within a 30 second period to produce the food composition, the food composition comprising a shelf stable, pliable dough, having pliability at 20° C. for at least 6 months. In some embodiments, caseinate includes calcium caseinate.

In some embodiments, a method of making a food composition, the method comprising combining ingredients to produce a mixture having a protein content of at least 30% protein by dry weight of the mixture, the ingredients including: 1) a protein blend in an amount of about 35% to 50% by weight of the mixture, the protein blend including a highly soluble protein in an amount of at least 30% by weight of the protein blend, and insoluble protein in an amount of at least 12% by weight of the protein blend, 2) a liquid composition in an amount of about 50% to about 65% by weight of the mixture, and 3) a calcium source; and applying shear to the mixture for a sufficient amount of time to achieve a temperature increase in the mixture of at least 5° C. within a 30 second period to produce the food composition, the food composition comprising a shelf stable, pliable dough, having pliability at 20° C. for at least 6 months.

In some embodiments of a method provided herein, the insoluble protein includes a soy protein concentrate or a soy protein isolate.

In some embodiments of a method provided herein, the protein blend further includes a milk protein concentrate or a milk protein isolate. In some embodiments, at least a portion of the milk protein concentrate or milk protein isolate includes partially hydrolyzed milk protein.

In some embodiments of a method provided herein, the liquid composition includes water, a soluble fiber, a sweetener, an emulsifier, a water activity modifier, or any combination thereof.

In some embodiments of a method provided herein, the shear can be applied using a batch mixer or an extruder.

In some embodiments of a method provided herein, the method further includes a step of forming the food composition into pieces to form a food product.

In some embodiments of a method provided herein, the method further includes a step of combining the food composition with one or more additional ingredient to form a food product. In some embodiments, the one or more additional ingredient includes a particulate. In some embodiments, the particulate comprises from about 10% to about 20% by weight of the food product. In some embodiments, the particulate can be heat-sensitive.

In some embodiments of a method provided herein, the method further includes a step of cooling the mixture to a temperature of less than 29° C.

In some embodiments of a method provided herein, the method further includes a step of packaging the food composition to form a food product.

Also provided are food compositions produced by any of the disclosed methods.

Also provided are food products, including a food composition provided herein.

In some embodiments, a food product provided herein includes a particulate. In some embodiments, the particulate can be from about 10% to about 20% by weight of the food product. In some embodiments, the particulate can be heat-sensitive.

These and various other features and advantages will be apparent from a reading of the following detailed description.

DETAILED DESCRIPTION

The present disclosure relates to a pliable food composition having high protein content that retains pliability over a shelf life of at least 6 months. A food composition provided herein achieves a desired pliability over shelf life with the inclusion of a protein blend provided herein and a method described herein, as compared to a food composition that does not contain the protein blend or is made according to a method described herein, which becomes hard over shelf life.

A method for making a composition provided herein includes combining ingredients to produce a mixture having a protein content of at least 30% (e.g., 30% to about 50%, or about 35% to about 45%) by dry weight of the mixture. Ingredients included in the mixture comprise a protein blend in an amount of about 35% to about 50% (e.g., about 38% to about 48%, or about 35% to about 45%) by weight of the mixture, and a liquid composition in an amount of about 50% to about 65% (e.g., about 52% to about 62%, or about 55% to about 65%) by weight of the mixture.

A protein blend provided herein includes a caseinate (e.g., calcium caseinate, sodium caseinate, or the like, or combinations thereof) in an amount of at least 4% (e.g., about 5% to about 15%, or about 6% to about 10%) by weight of the protein blend. A caseinate in a protein blend provided herein enhances, or is required for, a temperature spike when applying shear to a mixture containing the protein blend and a liquid composition. Surprisingly, in the absence of a temperature spike, a food composition provided herein does not have a desired pliability at 20° C. over a shelf life of at least 6 months.

As used herein, a "temperature spike" refers to an increase in temperature of at least 5° C. (e.g., at least 6° C.) within a 30 second time period (e.g., within 20 seconds, or within about 10 seconds to about 15 seconds) when applying shear to a mixture containing a protein blend and a liquid composition described herein. A temperature spike can occur at any point during application of shear to a mixture provided herein. In some embodiments, a temperature spike can occur after about 2 minutes (e.g., about 3 minutes to 10 minutes, or 3 minutes to 5 minutes) of shear application to a mixture. In some cases, application of shear at a higher rate can reduce the time before achieving a temperature spike.

In some embodiments, a mixture having a temperature of about 20° C. to about 30° C. can increase in temperature by at least 5° C. during application of shear. For example, a mixture having temperature of about 27° C. can increase in temperature to about 33° C. within a 30 second time period after applying shear for about 4 minutes.

It is to be understood that the temperature of a mixture can increase during application of shear prior to a temperature spike. For example, a mixture can be at a temperature of about 20° C. prior to application of shear and increase over time to about 25° C. prior to achieving a temperature spike. A temperature spike can be distinguished from such a general temperature increase by the rate of temperature increase. That is, while a general temperature increase occurs at a rate of less than 5° C. within a time period of 30 seconds, a temperature spike occurs at a rate of at least 5° C. within a time period of 30 seconds.

In some embodiments, a temperature spike can be associated with a reduction in viscosity at the same time. In some embodiments, a calcium source can be used instead of, or in addition to, a caseinate to enhance or cause a temperature spike when applying shear to a mixture containing a protein blend and a liquid composition. The amount of calcium in a mixture containing a protein blend and a liquid composition can be up to about 10% by weight of the mixture.

A protein blend provided herein further includes a highly soluble protein in an amount of at least 30% (e.g., about 40% to about 60%, or about 45% to about 55%) by weight of the protein blend. As used herein, a "highly soluble protein" refers to a protein that readily dissolves and disperses in water at 25° C. Examples of highly soluble proteins include, for example, whey protein isolate, whey protein concentrate, egg protein, albumin, and the like, or combinations thereof. It is to be understood that different sources of the same protein type (e.g., whey protein) can have different solubility indexes due to differences in purification methods, physical or chemical modifications, or other variables. A highly soluble protein can provide a continuous matrix in which other components are dissolved or embedded in in a food composition provided herein. In some instances, a highly soluble protein can contribute to a desired texture of a food composition provided herein, or a food product containing the food composition. A highly soluble protein can also contribute to manufacturability of a food composition containing the highly soluble protein by contributing to a rheology of the food composition that can be worked using standard manufacturing equipment (e.g., a mixer or an extruder) without requiring the addition of heat or other inputs to affect rheology.

A protein blend provided herein also contains an insoluble protein in an amount of at least 12% (e.g., from 12% to about 25%, or from about 15% to about 20%) by weight of the protein blend. As used herein, an "insoluble protein" refers to a protein that does not readily dissolve, or dissolves very slowly (e.g., over several hours or days), in water at 25° C. Examples of insoluble proteins include, for example, soy protein isolate, soy protein concentrate, and the like, or combinations thereof. It is to be understood that different sources of the same protein type (e.g., whey protein) can have different solubility indexes due to differences in purification methods, physical or chemical modifications, or other variables. As with highly soluble proteins, an insoluble protein should be selected based on solubility index, as determined using the method described above. An insoluble protein can contribute to a desired pliability of a food composition by contributing to a high protein content while limiting water migration within the food composition.

In some embodiments, a protein blend provided herein can contain one or more additional protein ingredient, such as a milk protein concentrate or a milk protein isolate. In some embodiments, a milk protein concentrate or a milk protein isolate can contain a partially hydrolyzed milk protein.

A liquid composition provided herein can be combined with a protein blend to produce a mixture. A liquid composition can include liquids and semi-liquids, such as a slurry. A liquid composition can include water, a fiber (e.g., inulin, soluble corn fiber, oat fiber, citrus fiber, and the like), a sweetener (e.g., maltitol, stevia, sugar, maple syrup, corn syrup, honey, erythritol, and the like), a flavorant (e.g., vanilla, natural flavors, artificial flavors, salt, and the like), an emulsifier (e.g., lecithin, mono- and diglycerides, and the like), a water activity modifier (e.g., glycerine, salt, polydextrose, and the like), a softener (e.g., glycerine, polydextrose, and the like), and the like, or any combination thereof. A liquid composition should provide sufficient moisture to hydrate the highly soluble protein in the protein blend, and at least partially hydrate the caseinate in the protein blend.

A liquid composition can be formulated in any appropriate manner based on the desired flavor, sweetness, or other attributes. For example, a liquid composition can contain, by weight of the liquid composition, a fiber in an amount of up to 90% (e.g., 40% to 80%, or 50% to 70%), a sweetener in an amount of up to 50% (e.g., up to 30%), a softener in an amount of up to 30% (e.g., up to 20%), and a flavorant in an amount up to 10% (e.g., up to 7%, or up to 5%).

A method provided herein includes applying shear to a mixture comprising a protein blend and a liquid composition. Shear can be applied to a mixture using any appropriate equipment, such as a batch mixer or an extruder. Shear is applied to a mixture for a sufficient amount of time to achieve a temperature spike as described herein, to produce a food composition provided herein. It is preferred that shear be applied to a mixture provided herein at ambient temperature. It is preferred that no additional heat source or cooling be applied to the mixture during application of shear until after a temperature spike is achieved. However, it is to be understood that equipment may be heated or cooled to prevent damage to the equipment.

After a temperature spike has occurred, a food composition becomes a pliable dough that remains pliable at 20° C. over a shelf life of at least 6 months (e.g., at least 8 months). In the absence of a temperature spike, a mixture will tend to dry and become hard over a shelf life of 6 months or more. As used herein, "pliable" refers to a state of being bendable or deformable with little or no cracking. A pliable food composition provided herein has a consistency that can be formed, cut, and/or mixed with other ingredients using standard food manufacturing equipment. In some embodiments, a pliable food composition provided herein can have a consistency similar to a firm taffy, which can be deformed by hand, but holds its shape in the absence of applied force.

In some embodiments, a food composition provided herein can be packaged for consumption, or it can be combined with one or more additional ingredient to make a food product. A food composition provided herein can be combined with one or more additional ingredient immediately or shortly after product, or can be stored for combination with one or more additional ingredient at a later time point. Additional food ingredients suitable for combining with a food composition include, for example, particulates (e.g., chocolate pieces, protein crisps, nuts or nut pieces, dried fruit or fruit pieces, confection pieces, or the like), powders (e.g., cocoa powder, starch, flour, or the like), creamy ingredients (e.g., nut butter), or coatings (e.g., chocolate coating, composite coating, sugar-based coating, or the like). Additional food ingredients can be mixed with a food composition or applied to at least a portion of a surface of the food composition. In some embodiments, an additional food ingredient can be included in an amount of from about 10% to about 20% by weight of a food product.

In some embodiments, a food composition provided herein can be cooled prior to adding one or more additional food ingredients, such as a heat-sensitive ingredient that melts or is otherwise damaged at temperatures above ambient (e.g., chocolate pieces, chocolate coating, and the like). A food composition can be cooled using any appropriate process, such as refrigeration, application of dry ice or cooled air, or the like. It is particularly surprising that a food composition provided herein can be cooled to a temperature below 29° C. (e.g., from about 15° C. to 29° C.) can retain its pliability and be able to be further mixed, formed, and/or cut using standard food manufacturing equipment.

A food composition provided herein, or a food product containing the food composition, can be formed using any appropriate method (e.g., extruded, cut, pinched, rolled, or the like) into any appropriate form (e.g., snack bar, bites, or the like). A food composition, or a food product containing the food composition, can be packaged as desired for storage (e.g., in bulk) or sale (e.g., individually packaged pieces).

A food product including a food composition provided herein can have a high protein content (e.g., at least 30% by weight, or at least 35% by weight). In some embodiments, a food product can be portioned and packaged such that an individual serving can have a target protein content (e.g., at least 7 grams, or at least 9 grams per serving).

In some embodiments, a food product including a food composition provided herein can have a high fiber content (e.g., at least 20% by weight, or at least 25% by weight). In some embodiments, a food product can be portioned and packaged such that an individual serving can have a target fiber content (e.g., at least 3 grams, or at least 4 grams per serving).

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a food composition, the method comprising:
   a. combining ingredients to produce a mixture having a protein content of at least 30% protein by dry weight of the mixture, the ingredients including:
      i. a protein blend in an amount of about 35% to 50% by weight of the mixture, the protein blend including:
         a) caseinate in an amount of about 5% to about 15% by weight of the protein blend;
         b) whey protein isolate, whey protein concentrate, egg protein, albumin, or combinations thereof in an amount of about 40% to about 60% by weight of the protein blend, and
         c) insoluble protein in an amount of 12% to about 25% by weight of the protein blend, the insoluble protein comprising a soy protein concentrate or a soy protein isolate;
      ii. a liquid composition in an amount of about 50% to about 65% by weight of the mixture, the liquid composition including water and a soluble fiber in an amount of 40% to 80% by weight of the liquid composition; and
   b. applying shear to the mixture for a sufficient amount of time to achieve a temperature increase in the mixture of at least 5° C. within a 30 second period to produce the food composition, the food composition comprising a shelf stable, pliable dough, having pliability at 20° C. for at least 6 months.

2. The method of claim 1, wherein the liquid composition includes a sweetener, an emulsifier, a water activity modifier, or any combination thereof.

3. The method of claim 1, wherein the shear is applied using a batch mixer or an extruder.

4. The method of claim 1, further comprising forming the food composition into pieces to form a food product.

5. The method of claim 1, further comprising combining the food composition with one or more additional ingredient to form a food product.

6. The method of claim 5, wherein the one or more additional ingredient includes a particulate.

7. The method of claim 6, wherein the particulate comprises from about 10% to about 20% by weight of the food product.

8. The method of claim 6, wherein the particulate is heat-sensitive.

9. The method of claim 8, further comprising cooling the mixture to a temperature of less than 29° C.

10. The method of claim 1, further comprising packaging the food composition to form a food product.

11. A food composition produced by the method of claim 1.

12. A food product, comprising the food composition of claim 11.

13. The food product of claim 12, further comprising a particulate.

14. The food product of claim 13, wherein the particulate comprises from about 10% to about 20% by weight of the food product.

15. The food product of claim 13, wherein the particulate is heat-sensitive.

16. A method of making a food composition, the method comprising:
   a. combining ingredients to produce a mixture having a protein content of at least 30% protein by dry weight of the mixture, the ingredients including:
      i. a protein blend in an amount of about 35% to 50% by weight of the mixture, the protein blend including:
         a) whey protein isolate, whey protein concentrate, egg protein, albumin, or combinations thereof in an amount of about 40% to about 60% by weight of the protein blend, and
         b) insoluble protein in an amount of 12% to about 25% by weight of the protein blend, the insoluble protein comprising a soy protein concentrate or a soy protein isolate;
      ii. a liquid composition in an amount of about 50% to about 65% by weight of the mixture, the liquid composition including water and a soluble fiber in an amount of 40% to 80% by weight of the liquid composition; and iii. a calcium source; and
b. applying shear to the mixture for a sufficient amount of time to achieve a temperature increase in the mixture of at least 5° C. within a 30 second period to produce the food composition, the food composition comprising a shelf stable, pliable dough, having pliability at 20° C. for at least 6 months.

17. The method of claim 16, wherein the liquid composition includes a sweetener, an emulsifier, a water activity modifier, or any combination thereof.

18. The method of claim 1, wherein the protein blend comprises milk protein concentrate or milk protein isolate.

19. The method of claim 1, wherein the shear is applied to the mixture at ambient temperature and the temperature increase in the mixture of at least 5° C. within a 30 second period occurs after about 2 minutes of shear application to the mixture.

20. The method of claim 1, wherein the shelf stable, pliable dough, having pliability at 20° C. for at least 6 months has a consistency similar to a firm taffy.

* * * * *